R. PEMBLE, Sr., & R. PEMBLE, JR.
Device for Catching and Holding Hogs.

No. 207,437  Patented Aug. 27, 1878.

UNITED STATES PATENT OFFICE.

ROBERT PEMBLE, SR., AND ROBERT PEMBLE, JR., OF CERRO GORDO, ILLINOIS.

IMPROVEMENT IN DEVICES FOR CATCHING AND HOLDING HOGS.

Specification forming part of Letters Patent No. 207,437, dated August 27, 1878; application filed July 30, 1878.

*To all whom it may concern:*

Be it known that we, ROBERT PEMBLE, Sr., and ROBERT PEMBLE, Jr., of Cerro Gordo, in the county of Piatt and State of Illinois, jointly have invented a new and Improved Device for Catching and Holding Hogs; and we do hereby declare the following to be a full and exact description of the same, reference being had to the accompanying drawings, forming part of this specification, in which—

Figure 1:
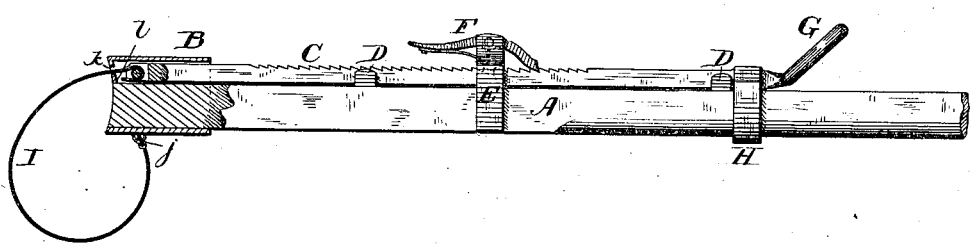
Figure 2:
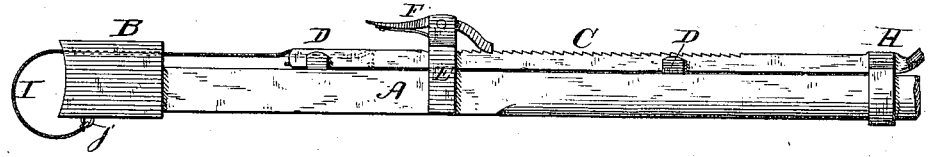

Figure 1 is a side elevation, showing the holding-loop extended and a part of the end ferrule broken away; and Fig. 2 is a similar view, showing the loop drawn up.

Similar letters of reference in the accompanying drawings indicate the same parts.

Our invention has for its object to provide for the use of farmers and others a simple and effective implement for catching and holding hogs while applying rings to the nose; and to this end it consists in a handle provided with a sliding stop-bar, and a wire or other loop connected, respectively, to the stop-bar and handle, whereby, when it is desired to catch a hog, the operator need not approach near enough to frighten him, but simply slip the loop over his nose, then draw the stop-bar till the loop is tightened securely, when the handle is held by one hand and the ring applied to the nose of the hog with the other, as we will now proceed to point out more in detail.

In the accompanying drawings, A is a light wooden handle, made several feet in length— say three or four, more or less, as may be most convenient—and provided at one end with a stout metal ferrule, B, slightly concaved at its outer end to conform to the nose of a hog, against which it rests when the animal is caught. C is the stop-bar, adapted to move on one side of the handle between end guides D D and a central loop, E. Its outer side is formed with ratchet-teeth, with which a spring thumb-pawl, F, engages, being pivoted within the central guide-loop. The pawl and teeth are so arranged relatively that the bar is locked against movement toward the ferrule, but moves freely away from it, for a purpose to be presently described.

The sliding stop-bar is provided with a looped handle, G, at its outer end, and with a sliding guide-ring, H, to prevent it from springing away from the handle in its movements.

I is a loop of wire, cord, rawhide, or other strong material, formed by connecting one end to that side of the ferrule opposite the sliding bar, as shown at *j*; thence extending, it crosses the concave end of the ferrule to the point *k*, where it enters the ferrule, and, passing through the same, is firmly secured to the end of the sliding stop-bar. The stop-bar is limited in its movements to form the loop by entering the ferrule until it encounters a shoulder, *l*, therein, and is prevented at this end from being laterally displaced by the walls of the ferrule, as shown in Fig. 1.

The method of operating the implement is as follows: The handle is grasped by one hand, and the hand-loop of the sliding stop-bar by the other. The bar is then moved along the handle to form the extended or open loop, as above described, the ratchet-teeth and pawl readily permitting this movement. When the operator approaches within reach of the hog to be caught, he slips the loop over the animal's nose, and draws it tightly around it by pulling upon the stop-bar, as will be readily understood, the pawl and ratchet locking the bar firmly in place. The hog is thus caught, and the operator, holding the implement in one hand, applies the ring to the hog's nose with the other. The pressure of the fine wire or cord prevents the hog from shaking his head to avoid the application of the ring, and the latter can therefore be put in the proper place instantaneously, thereby saving the time and trouble of a reapplication of the ring, which is frequently necessary with the ordinary method.

The implement is cheap and durable, and facilitates the labor of "ringing" hogs to a very great degree, and is therefore of much value and importance to farmers and others who raise hogs.

Having thus described my invention, what I claim as new is—

1. An implement for catching and holding hogs, consisting, essentially, of a handle, a sliding stop-bar, and a loop of wire, cord, or other suitable material, to catch over the nose of the hog and be contracted thereon by the operation of the stop-bar, substantially as described, for the purpose specified.

2. The ferrule B, combined with the wooden handle A, the sliding stop-bar C, and the wire loop I, substantially as described, for the purpose specified.

3. The ferrule B on the end of the wooden handle, constructed with a concave end to fit against the nose of the hog, and with an internal shoulder and side walls to arrest the forward throw of the stop-bar and prevent its lateral displacement, substantially as described.

ROBERT PEMBLE, Sr.
ROBERT PEMBLE, Jr.

Witnesses:
M. BRANDOM,
R. W. McCLELLAND.